(12) United States Patent
Franke et al.

(10) Patent No.: US 7,382,471 B2
(45) Date of Patent: Jun. 3, 2008

(54) NON-CONTACT APPARATUS AND METHOD FOR MEASURING SURFACE PROFILE

(75) Inventors: Ernest A. Franke, San Antonio, TX (US); Michael J. Magee, Rio Medina, TX (US); Michael P. Rigney, San Antonio, TX (US); Joseph N. Mitchell, San Antonio, TX (US); Robert J. Beeson, Catonsville, MD (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/313,671

(22) Filed: Dec. 22, 2005

(65) Prior Publication Data

US 2006/0103854 A1    May 18, 2006

Related U.S. Application Data

(62) Division of application No. 10/184,003, filed on Jun. 27, 2002, now Pat. No. 7,061,628.

(60) Provisional application No. 60/301,180, filed on Jun. 27, 2001.

(51) Int. Cl.
   *G01B 11/24*    (2006.01)
(52) U.S. Cl. .................................... 356/604
(58) Field of Classification Search ......... 356/603–604
   See application file for complete search history.

(56) References Cited

U.S. PATENT DOCUMENTS

| | | | |
|---|---|---|---|
| 4,480,920 A | 11/1984 | Boyer et al. | 356/376 |
| 4,657,394 A | 4/1987 | Halioua | 356/376 |
| 4,895,448 A | 1/1990 | Laird | 356/376 |
| 4,952,149 A | 8/1990 | Duret et al. | 433/215 |
| 5,029,243 A | 7/1991 | Dammann et al. | 219/121.77 |

(Continued)

OTHER PUBLICATIONS

Magee et al, "Adaptive camera calibration in an industrial robotic environment", Proceedings of the 3rd international conference on industrial and engineering applications of artificial intelligence and expert systems—vol. 1, (1990), pp. 242-251.*

(Continued)

*Primary Examiner*—Richard A. Rosenberger
(74) *Attorney, Agent, or Firm*—Grossman, Tucker, Perreault & Pfleger, PLLC (57) ABSTRACT

Embodiments of the invention provide a non-contact method for measuring the surface profile of an object that can include generating a point-type optical signal and projecting it on a rotatable precision optical grating, generating a rotating pattern of light and dark lines onto the object, recording a series of images of the rotating pattern moving across the object with an image receiving device and calculating the surface profile of the object. Other embodiments can include a method to calibrate the system and a non-contact apparatus that generally includes a point-type light source, a rotatably mounted optical grating being configured to project a moving grating image on the object, a processor in communication with the image capturing device and configured to receive image input from the image capturing device and generate a surface profile representation of the object therefrom.

19 Claims, 10 Drawing Sheets

U.S. PATENT DOCUMENTS

| | | | |
|---|---|---|---|
| 5,289,264 A | 2/1994 | Steinbichler | 356/376 |
| 5,841,894 A | 11/1998 | Horie | 382/154 |
| 6,084,979 A * | 7/2000 | Kanade et al. | 382/154 |
| 6,847,462 B1 | 1/2005 | Kacyra et al. | 356/601 |

OTHER PUBLICATIONS

"Full-field Surface Profiling Using Dynamic Projected Grids," Robert J. Beeson, Southwest Research Institute, San Antonio, TX, SPIE vol. 3204, pp. 68-73, (1997).

* cited by examiner

NON-CONTACT APPARATUS AND METHOD FOR MEASURING SURFACE PROFILE

CROSS REFERENCE TO RELATED APPLICATIONS

This application claims priority to and is a divisional of U.S. patent application Ser. No. 10/184,003, entitled, NON-CONTACT APPARATUS AND METHOD FOR MEASURING SURFACE PROFILE, filed Jun. 27, 2002, now U.S. Pat. No. 7,061,628 which claims priority from U.S. Provisional Patent Application No. 60/301,180, filed Jun. 27, 2001, both of which are hereby incorporated by reference in their entirety.

BACKGROUND OF THE INVENTION

1. Field of the Invention

The present invention generally relates to the determination of surface profiles through optical-based methodologies and apparatus.

2. Description of the Related Art

Accurate measurements of surface profiles are an important element in the inspection of manufactured parts, particularly when the inspection process is an automated process. Current inspection/surface profile measurement systems generally utilize coordinate measuring machines/devices, laser displacement gauges, and/or other similar methods. However, conventional methods are generally configured to measure only a single point at a time, and therefore, these systems are both time and resource intensive.

Techniques such as Moiré Interferometry, Fourier Transform Profilometry, and other grid projection methods require that an entire image (or may entire images) of the surface be analyzed to measure the 3-dimensional position of even one point on the surface, which increases data acquisition and analysis time. Moreover, if there is a discontinuous step in the surface, there will be a corresponding jump in the grid pattern and it may be impossible to uniquely identify gridlines across this discontinuity so that accurate measurements cannot be made. Therefore, although these methods are appealing, the resources required to analyze. the entire image surface in a 3-dimensional manner make these methods generally impracticable.

Another method utilized for surface analysis is structured light measurement techniques. For example, structured light projection techniques, where a line, grid, or other regular pattern is optically projected onto the surface of interest, have previously been used with machine vision techniques. However, patterns from these types of techniques are generally difficult to interpret, and further, surface discontinuities in the object are known to result in ambiguous measurements when these techniques are employed. Conventional structured light techniques generally require that the optical projection system and the camera system be placed in precise alignment, which causes difficulty if the system becomes misaligned, as can easily happen. Conventional structured light methods also generally require that the object or the optical system be moved precisely in order to allow for an accurate scan of the entire scene and/or object surface. These precise processes and movements are expensive to generate, operationally slow, and very often require data collection for areas that are not of interest.

Figure 1:
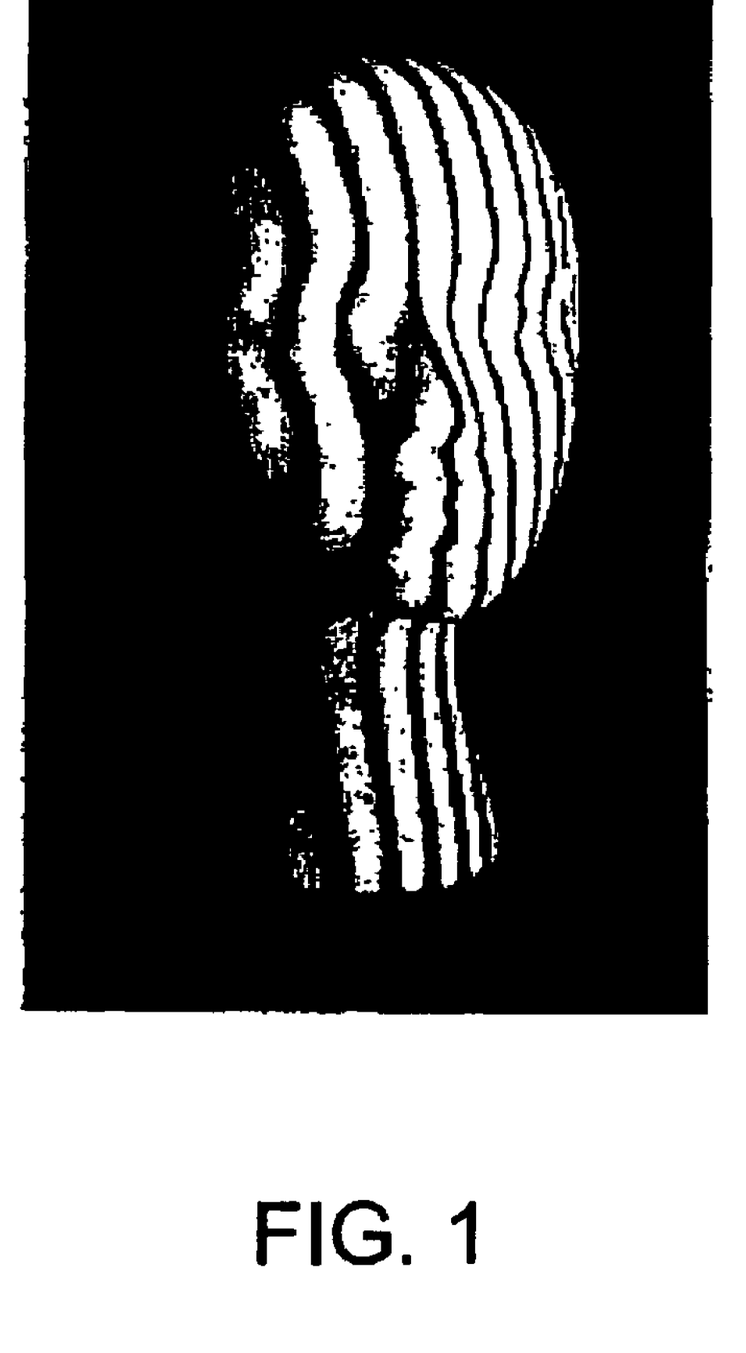
FIG. 1 illustrates an exemplary deformation of grid lines on a 3 dimensional surface.

In particular, structured light techniques for 3-dimensional surface profiling typically utilizes a line, grid, or other pattern of light projected onto the object field. A video camera may then be utilized to capture an image of the grid or pattern projected onto the target surface. If the surface is flat, the lines of the grid will appear straight and uniform. If the surface is not flat, then the surface features will alter the appearance of the grid, which will appear curved, bent, or otherwise deformed by the shape of the surface, as illustrated in FIG. 1. If the exact position, orientation, and projection angle of each line of the original grid is known and each grid line on the surface is uniquely identifiable, then simple and well-known triangulation formulas may be applied to calculate the profile of the surface from the measured deformation of the grid lines projected on the surface. The simplicity of basic triangulation typically makes it the technique of choice for automated inspection systems, as the more complex techniques require calculations too lengthy for real-time application and usually involve a level of user interpretation of the data for all but the simplest surfaces. Davies discusses the basic concepts and describes the difficulties of applying the approach to typical parts in the publication entitled *Machine Vision: Theory, Algorithms and Practicalities*, 1997.

Complex surfaces are also difficult to efficiently measure with automated 3-dimensional techniques. Large surface discontinuities generally result in discontinuities in the grid pattern (or the "interference" pattern) that are almost impossible for machine vision systems to interpret autonomously, despite the use of complicated grid phase-shifting techniques and advanced fringe-processing algorithms. Even in the case of triangulation, surfaces with sharp edges and large jumps between surfaces can be problematic due to the requirement of having to uniquely identify each grid line in the image. If exact identification of a grid line is not possible, then the physical position of that line in the original grid remains unknown to the system, and that portion of the measurement incomplete. Therefore, in this situation the resulting triangulation calculation is generally unable to correctly determine the height or surface profile of the surface being measured.

One method of avoiding this ambiguity is to project a single line or stripe onto the object field and move the object under the line to obtain the complete measurement. U.S. Pat. No. 4,875,777 to Harding describes such a structured light profiler process wherein a sheet of light is projected along the cross-sectional plane of interest. A video camera captures images therefrom and a processor is used to determine the profile of the object as it is translated under the sheet of light. Yet another solution to this problem is to measure the surface several times with the projected grid and observation camera at different positions relative to the surface. Obviously, this is a complex solution that is difficult to implement in an autonomous, real-time system, as several images must be acquired and precisely aligned with each other. Another solution is to introduce a time-varying projected pattern instead of a simple stationary grid. One reported method utilizes a back-lit liquid crystal display (LCD) panel which creates a "checkerboard" pattern on the surface, with each pixel varying in time in a unique pattern of "on" and "off" flashes." By collecting many sequential images of the flashing pattern, each pixel in the image can eventually be identified as originating from a unique pixel in the LCD, thus allowing an exact triangulation calculation to be made. However, this method has several disadvantages, which include the need to synchronize the LCD frame rate to the camera frame rate to ensure accurate recording of the time-varying pixels, and the fact that the field-of-view versus resolution trade-off (as well as the system cost) are all driven by the size and number of pixels in the LCD panel.

Yet another method that has been used to identify specific grid lines is to use multiple light sources controlled to produce different grating projection patterns as described in U.S. Pat. No. 6,122,062 to Bieman and Rutledge. A video camera captures images of the different projection patterns and a processor converts the patterns into a three-dimensional bit map of the object. Further, U.S. Pat. No. 5,636,025 to Bieman and Michniewicz describes a device using Moiré fringes generated by a grating in the light projection device and a second grating in the imaging device. A mechanical translation device moves the camera lens to cause a change in the fringe pattern so that both coarse and fine measurements can be made to overcome the ambiguity problem. However, Moire-type fringe methods require precise non-uniform type motion in moving the grating, require complicated fringe identification algorithms, and the entire image must be recorded to map even one point. Therefore, Moire-type methods are generally undesirable as a result of these additional requirements.

A more practical method of introducing a time-varying pattern onto the surface is to simply rotate a linear projected grid. A specific point on the surface will be alternately light and dark as the grid rotates and the number of on/off flashes occurring at any pixel in the image during one revolution of the grid is determined by the distance of that point from the projected center of the grid's rotation. By measuring the number of grid crossings or "transitions" per revolution, the distance between the point on the grid and the center of the grid's rotation is known, allowing unique identification of the grid source point, and therefore, an unambiguous surface height calculation from the triangulation algorithm. However, reported use of this technique generally indicates that it is very limited in its technical capabilities. For example, measurements were made at only one point on the surface by using the rotating grid to chop a very narrow laser beam, creating a flashing "point" on the target surface. A method of scanning this point would be required to measure the entire surface, which would make the system extremely slow. Also, the signal was recorded by a single photodetector instead of an imaging array, requiring realignment at every point. The data was analyzed with analog electronics by measuring the frequency of the grid-crossings, which is complicated by the fact that the received optical intensity is actually a frequency-modulated signal with a pseudo-sine wave carrier instead of a simple, single-frequency signal.

Figure 2:
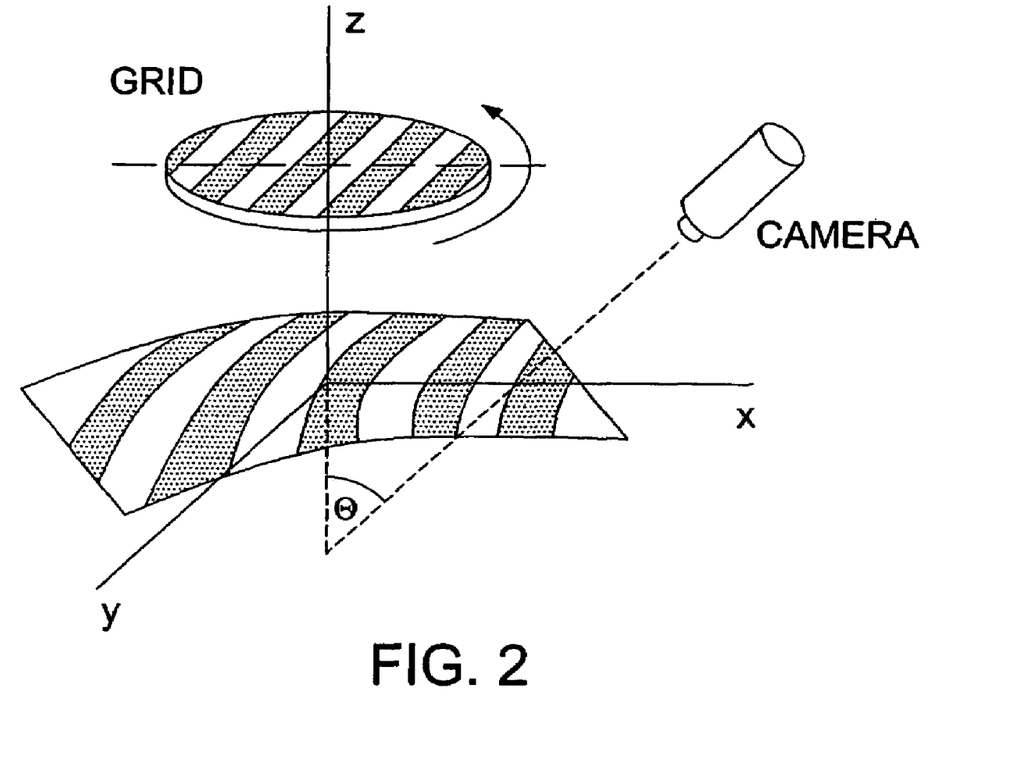
FIG. 2 illustrates an exemplary dynamic grid projection configuration.

Another conventional method, as described by Beeson in an article entitled "Full-Field Surface Profiling Using Dynamic Projected Grids," (SPIE Proceedings Vol. 3204, 1997, pp. 68-73), includes a rotating grid approach to 3-dimensional structured light surface profiling incorporating a measurement algorithm that is amenable to digital processing, and is more accurate than the analog alternative, while allowing for measurement of any pixel (or all pixels) in the field of view. This approach consists of projecting the image of a rotating grid perpendicularly onto the surface to be measured. A camera images the surface from an angle θ, as shown in FIG. 2. By counting the number of light-dark transitions at a given camera pixel position, it is possible to determine the distance that pixel lies from the axis of rotation of the projected grid pattern. For the case of collimated projection and imaging, the position of a point on the surface can be calculated trigonometrically when the positions and orientations of the projection system and the camera are known. Through analysis of the intervals between light-dark transitions at a given pixel it is possible to interpolate to obtain measurements more accurate than the grid-line spacing.

One shortcoming of the method described by Beeson is the requirement for parallel projection of the grid lines and image. A second problem is that the method given to calculate the surface profile requires precise knowledge of the position and orientation of the grid projection system and the imaging camera used. In many practical applications the positions of the projection system and camera will be constrained by other equipment such as conveyors, robots or other material handling apparatus.

Therefore, in view of the disadvantages presented by conventional surface profiling systems and methods, there is a need for an optical, non-contact method for conducting surface profiling that is capable of simultaneously measuring an array of points on the surface of an object. Further, there is a need for a method for surface profiling that includes a procedure for automatically calibrating the apparatus without the need for precise measurements of the camera and/or projector positions, orientations and optical characteristics. Further still, there is a need for a surface profiling method wherein scanning is not required, and the only motion is generally that of a spinning grid whose rotational speed can be easily controlled with inexpensive hardware. Further, there is a need for a surface profiling apparatus and/or method wherein image-processing algorithms may be incorporated into the system that will allow the identification and measurement of the surface, regardless of the random orientation of the object with respect to the measurement system. Finally, there is a need for a method for surface profiling that includes an interpolation algorithm that results in a measurement resolution much greater than that of traditional grid-projection methods.

SUMMARY OF THE INVENTION

Embodiments of the invention generally provide a method for calibrating a dynamic structured light measuring system. The method generally includes determining a focal length of an imaging device, and determining a transformation from an imaging device coordinate system to an absolute coordinate system. The method further includes determining absolute coordinates of points in a plane, wherein a Z coordinate of the plane is known, and determining at least one equation for at least one projected grid line track at the intersection of at least one quadric surface with the plane.

Embodiments of the invention further provide a method for calibrating a dynamic structured light measuring system, wherein the method includes determining a focal length of an optical imaging device positioned above a reference measurement surface, and calculating a transformation from a camera coordinate system to an absolute coordinate system. The method further includes determining absolute coordinates of points in a first plane above the reference measurement surface using the transformation, wherein a distance from the reference measurement surface to the first plane is known, and determining at least one representative equation for at least one quadric surface containing projected grid line tracks.

Embodiments of the invention further provide a non-contact method for measuring a surface of an object. The method includes projecting a rotating grid onto the surface of the object, capturing a plurality of images of the surface of the object having the rotating grid projected thereon with an imaging device, and determining at least one quadric surface above and at least one quadric surface below a point on the surface of the object where a pixel ray of the imaging device intersects the surface of the object.

Embodiments of the invention further provide a non-contact method for measuring the surface profile of an object. The method may include generating a point-type optical signal, projecting the point-type optical signal on a rotatable precision optical grating. The method further includes generating a rotating pattern of light and dark lines onto the object to be measured, recording a series of images of the rotating pattern or light and dark lines moving across the object to be measured with an image receiving device, and calculating the surface profile of the object to be measured from the series of images.

Embodiments of the invention provide a non-contact apparatus for measuring the surface profile of an object, including a point-type light source and a rotatably mounted optical grating positioned in an optical path of the point-type light source, the optical grating being configured to project a moving grating image on the object. The apparatus further includes an image capturing device positioned to view the object and the moving grating image projected thereon and a processor in communication with the image capturing device, the processor being configured to receive image input from the image capturing device and generate a surface profile representation of the object therefrom.

Embodiments of the invention further provide a non-contact apparatus for measuring the surface profile of an object, wherein the apparatus includes a point-type light source positioned above a measurement surface and at an acute angle to the measurement surface. The apparatus further includes a rotatably mounted optical grid positioned between the point-type light source and the measurement surface, a camera fixedly positioned above the measurement surface, the camera being configured to view the measuring surface, and a microprocessor in communication with the camera, the microprocessor being configured to receive images from the camera and generate an electronic surface profile representation of the object.

BRIEF DESCRIPTION OF THE DRAWINGS

So that the manner in which the above embodiments of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the invention generally provide a method and apparatus for projecting an optical pattern onto an object field having an object positioned within the object field, recording multiple electronic images of the pattern projected onto the surface of the object, and a mathematical procedure for uniquely determining the 3 dimensional coordinates of points on the surface of the object from the multiple images.

Figure 3:
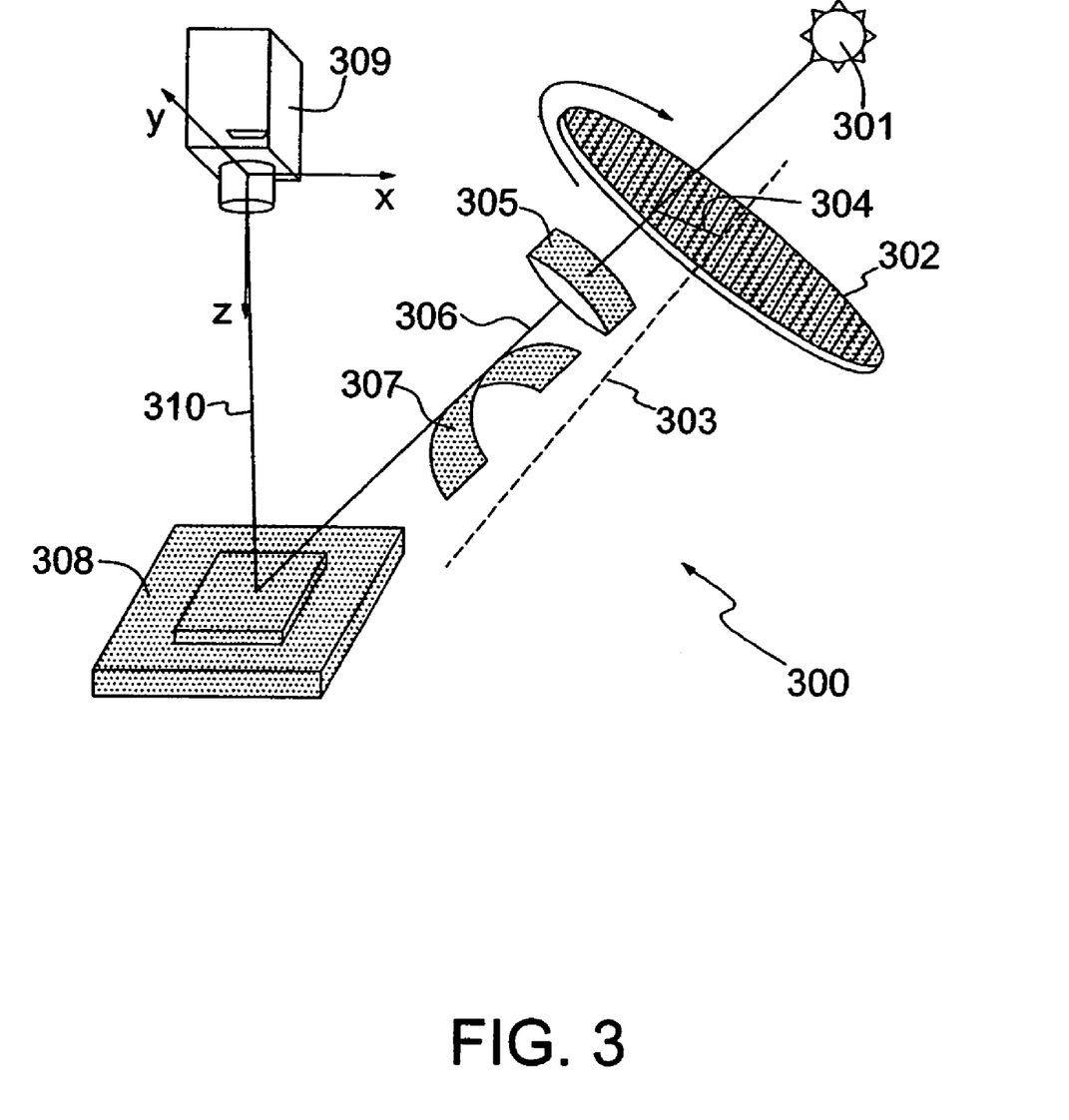
FIG. 3 illustrates an exemplary hardware configuration of an embodiment of the invention.

FIG. 3 illustrates an exemplary hardware configuration of an embodiment of the invention. The dynamic grid projection apparatus 300 of the present exemplary embodiment is generally configured to project an optical pattern onto an object field. Illumination from a point source of light 301 may be directed through an optical grating device 302, which may be a grid of a predetermined size and granularity rotating at a known velocity, and then onto a measured surface 308 by one or more projection optical lenses 305. The optical grating device 302 produces a rotating and/or radial optical pattern on surface 308 while being rotated at a constant rate. The resulting monochrome images may be recorded by an imaging device 309, which may be a digital camera positioned at an offset location from the measured surface 308.

The operation of the dynamic grid projection apparatus 300 may be better understood through observing that the pattern projected by grating device 302 rotates about a central grid rotational axis 303. Therefore, if an imaginary line 304, which is a line that is normal to the gridlines through the rotational axis 303, is constructed through the axis of rotation 303, crossing each of the lines of the grating at a right angle, then the respective distances from the center of rotation to each individual grating line of grating device 302 may be designated 1, 2, 3, . . . n. Then the projected rays 306 passing through the intersections of the normal line 304 and the grating lines of the grating device 302 will generally trace out a set of quadric surfaces 307 in space as the grating device 302 rotates about axis 303. These quadric surfaces 307 may be designated (1, 2, 3, . . . n) in order to correspond to the respective grating lines numbered from the center of rotation, as each quadratic trace generally corresponds to a projection from an individual grating in grating device 302. Generally, however, the generated quadric surfaces 307 are not visually observed, and only certain points on the surfaces may be calculated where they intersect a surface in the object field.

When camera 309 is arranged to view the object field or measured surface 308 from a position that is not on the axis of rotation 303 of the projected grid, each pixel of the camera image plane defines a ray 310 projected to the object. The data from each pixel of the camera 309 may then be used to determine which quadric surface intersects the measured surface 308 where the pixel ray 310 also intersects the surface 308. Mathematically, the given ray 310 projected from the camera 309 will intersect a given quadric surface 307 in only two locations, and therefore, by properly limiting the measurement volume, only one of these intersections will be valid. This point/intersection where the surface of the object, the ray 310 from the camera, and the generated quadric surface 307 all intersect, uniquely defines a measurable three dimensional location on the surface of the object.

It should be noted, however, that the exemplary optical system of the invention is not restricted to parallel/collimated projection configurations, as perspective projection configurations, or other known projection techniques, may also be used with equal effectiveness without departing from the true scope of the invention. Primarily, this feature of the invention allows for modifying the measurement system of the invention to accommodate varying sizes of objects for measurement. For example, it is possible to select optics to project the grating onto a large surface and image a large object field. Also, varying degrees of granularity in the grating pattern, i.e., very fine grating patterns, may be used in order to measure relatively small objects with great accuracy. Therefore, a fine grating pattern may be projected onto a small area using microscopic optics so that high-resolution measurements can be made over a small object field, thus allowing for accurate measurement of extremely small objects.

Once the grid projection process is initiated in the embodiment of the invention illustrated in FIG. 3, then the image data collected by the imaging device 309 must be analyzed or processed in order to determine the surface dimensions of the measured surface/object 308. Therefore, in the present exemplary embodiment, for each pixel from each image acquired during the grid rotation, the image processing component of the invention will generally determine a fractional gridline number corresponding to the intersection of the pixel ray 310, quadric surface 307, and the object surface 308. The fractional gridline number generally results from the pixel ray 310 intersecting the object surface 308 between two lines corresponding to adjacent integer-valued quadric surfaces 307.

A sequence of images may be acquired during one or more revolutions of the grid 302. Data from each pixel of interest may then be independently analyzed. This pixel data generally consists of a series of image intensity observations obtained by the pixel during grid rotation. System configuration generally operates to ensure through appropriate selection of image spatial resolution, projected grid width, grid rotation speed, and camera frame rate, that the passing of every grid line over the surface features of the measured object is observed. The average value of the pixel data, for example, may be computed and used as a threshold to obtain a binary series of intensity values for the grid lines passing over the object surface. The pulse width of each contiguous series of black or white intensity values may then be computed using the known parameters of the system, i.e., the grid spacing, grid distance from the measured object, rate or rotation of the grid, etc. The signal may then be searched to find a tangential pulse, its width, and its location in the series of intensity values/signals. The tangential pulse may generally be defined as the pulse during which the grid orientation becomes normal to a line from the measured point to the grid center of rotation. The tangential pulse is often the maximum width pulse, although it need not necessarily always be the maximum width pulse in the present exemplary embodiment. As the measured point traverses a gridline edge moving away from the grid rotational center, the tangential pulse will generally be shorter than its two neighboring pulses. A search algorithm may be configured to examine the signal symmetry around the tangential pulse, and therefore, used to precisely locate the tangential pulse after selecting a pulse with maximum width as a starting point.

Generally, when the grid rotational center is not coincident with a grid-line center or a grid-line edge, two tangential pulses in the signal may be identified and analyzed. However, only a single tangential pulse generally needs to be analyzed if the grid rotational center corresponds to the special positions indicated above. Nevertheless, the second tangential pulse may be easily located when needed, as it typically occurs 180 degrees out of phase from the first tangential pulse.

Figure 4:
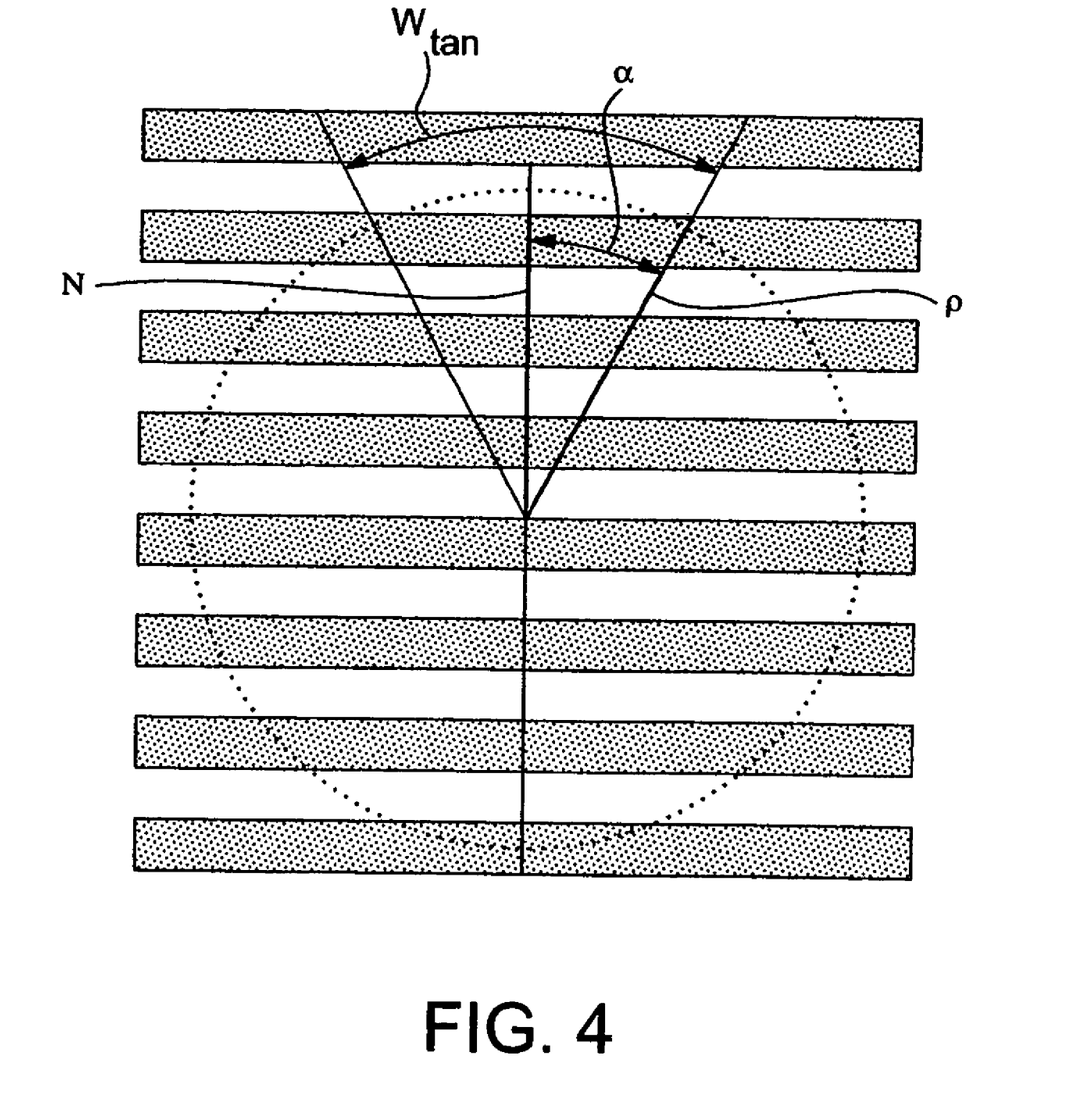
FIG. 4 illustrates a calculation process for a fractional grid line.

FIG. 4 illustrates an exemplary image processing computation that generally follows the principles espoused by Beeson, as noted above. In the exemplary computation, the fractional gridline number (ρ for a given pixel ray is determined. The number of gridlines (N) between the center of rotation and the specific pixel ray is computed as one-half the number of gridlines observed between two tangential pulses. The angle (α is computed from the observed width of the tangential pulse ($W_{tan}$) and the number of samples per rotation of the grid ($W_{rotation}$). Therefore, FIG. 4 illustrates the trigonometric relationship between ρ, α, and N. When two tangential pulses, which are illustrated as being 180 degrees out of phase, are used, the gridline numbers computed for the two pulses are averaged to obtain the fractional gridline number for the pixel. This procedure may therefore be used to process images acquired for system calibration and part measurement.

Embodiments of the invention also include a method of calibration, wherein the system for surface profile measurement can be calibrated by a series of images and calculations as described below. For example, the following procedure, which is similar to that described by Magee in an article entitled "*Adaptive Camera Calibration in an Industrial Robotic Environment*," may be executed to determine the focal length of a linear perspective projection camera model. This method may include orienting the camera such that various conditions are satisfied. For example, assume a right-handed forward image plane model for the camera with the Z-axis pointing down for the following calibration process. Using this reference coordinate system, in the camera's coordinate system, the center of the image plane corresponds to the point (0,0,f). The optical axis of the camera is then perpendicular to the optical table and is collinear with the Z axis of the 3D absolute coordinate system (ACS). The X and Y axes of the camera's image plane are generally parallel to the X and Y axes of the ACS. However, the camera is typically positioned at a sufficient distance from the optical table in order to achieve good depth of focus for the various objects to be measured, which is a parameter that may generally be determined for each individual camera in accordance with the optical characteristics thereof. Further, it may generally be assumed that the focal length of the camera is unknown and is to be computed based on a perspective (pinhole) projection camera model.

Figure 5:
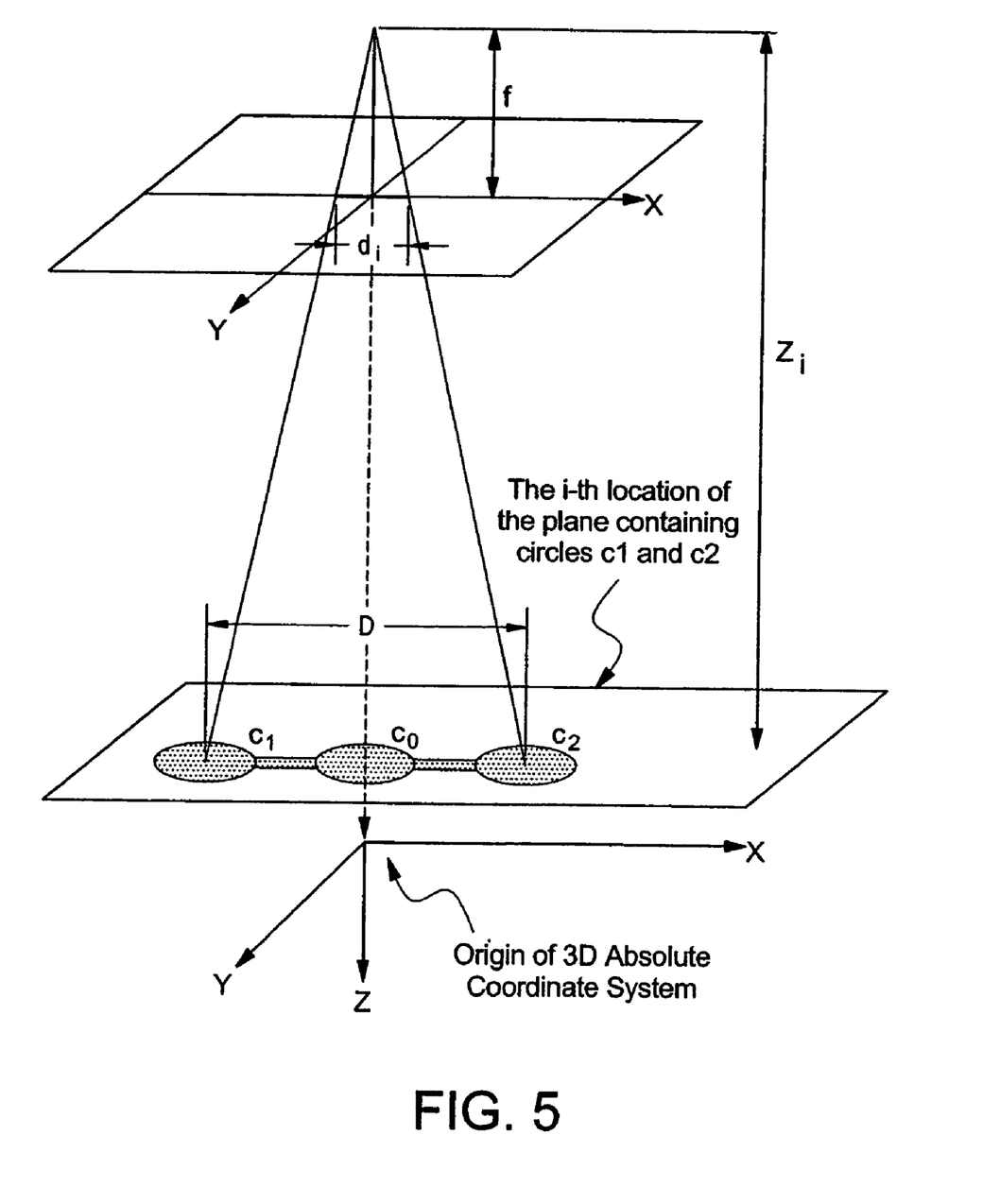
FIG. 5 illustrates an exemplary camera calibration system setup.

Once the camera is oriented, a planar calibration object at position "i" with three small circular markings ($c_1$, $c_0$, $c_2$) whose centers are collinear may be viewed by the camera in a manner such that the line joining the three circles is parallel with the camera's X axis, as generally shown in FIG. 5. Then the method may let D be the distance between the centers of the outer circles ($c_1$ and $c_2$). Therefore, at plane position i=1, the method may compute the image plane distance between the centroids of the outer circular markings, which may be denoted by the distance $d_1$. If the distance between the optical center of the camera and the plane of the calibration object is $Z_1$, then $(d_1/f)=(D/Z_1)$, as shown in FIG. 5. Thus, for plane position i=2, the method may raise the calibration object by a distance of ΔZ, while keeping it perpendicular to the optical axis of the camera. The new distance between the optical center and the calibration plane may then be denoted by $Z_2$ where $Z_2=Z_1-\Delta Z$.

Therefore, in the image plane, the distance between the centroids of the outer circular markings may be computed, where the distance $d_2$, $(d_2/f)=(D/Z_2)$. Thus, rewriting the previous two equations yields equations $D\ f=d_1\ Z_1$ and $D\ f=d_2\ Z_2$. Since the left sides of these equations are identical, $d_1\ Z_1=d_2Z_2$ and $d_1\ Z_1=d_2\ (Z_1-\Delta Z)$. Solving this equation for $Z_1$, it is apparent that $Z_1=\Delta Z\ d_2/(d_2-d_1)$. Then, using the equation $D\ f=d_1\ Z_1$, f may be determined from $f=(d_1/D)Z_1$.

Using the same setup described above for determining the focal length, a transformation from the camera coordinate system to an absolute coordinate system may be calculated. For example, the calibration markings may be placed such that the plane containing the calibration markings is coplanar with the absolute coordinate system. Further, the plane of the calibration markings may be set up to contain the origin of the absolute coordinate system, and the line joining the calibration markings may be collinear with the X axis of the absolute coordinate system. With these parameters established, as has been previously shown in FIG. 5, if $Z_0$ is the distance between the optical center of the camera and the plane of the calibration object, then the distance may be determined by the equation $Z_0=f\ (D/d_0)$.

Thereafter, the transformation from the camera's coordinate system to the absolute coordinate system is determined by the equation $Z_{absolute}=Z_{camera}-Z_0$. Conversely, the transformation form the absolute coordinate system to the camera coordinate system is determined by the equation $Z_{camera}=Z_{absolute}+Z_0$.

Figure 6:
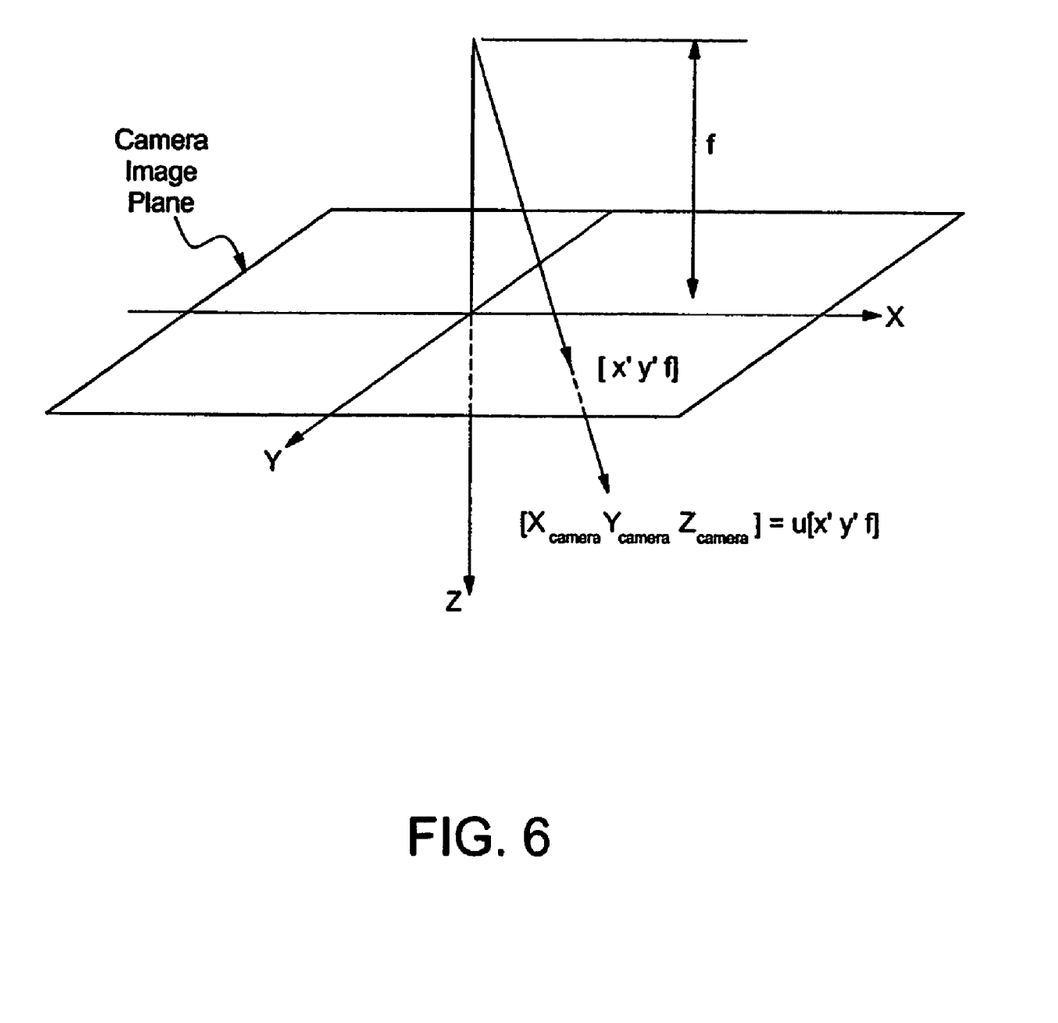
FIG. 6 illustrates a parametric equation for a projected ray in a coordinate system.

FIG. 6 illustrates the parametric equation for a projected ray in the camera coordinate system. From FIG. 6, it is evident that any point that projects onto the image plane coordinate (x' y') lies along a vector whose direction is defined by joining the optic center of the camera and the point (x' y' f) in the camera's coordinate system. In the camera's 3D coordinate system, therefore, this point may be represented by the equation $[X_{camera}\ Y_{camera}\ Z_{camera}]=u\ [x'\ y'\ f]$, wherein "u" is a scalar that parametrically constrains the length of the vector. However, if the three dimensional point lies on a plane of constant $Z_{camera}=Z_{absolute}+Z_0$, then the point may be represented the equation $[X_{camera}\ Y_{camera}\ (Z_{absolute}+Z_0)]=u\ [x'\ y'\ f]$. Therefore, the scalar "u" may be represented by the equation $u=(Z_{absolute}+Z_0)/f$. Using these derivations, $[X_{camera}\ Y_{camera}\ Z_{camera}]$ may be computed by substituting "u" into equation $[X_{camera}\ Y_{camera}\ Z_{camera}]=u\ [x'\ y'\ f]$, and therefore, the location of the same point in the absolute coordinate system may be computed from the equation $[X_{absolute}\ Y_{absolute}\ Z_{absolute}]=[X_{camera}\ Y_{camera}\ (Z_{camera}-Z_0)]$.

Embodiments of the invention also provide a method for determining the equation representative of the surface containing the projected grid line tracks. In order to determine this equation, it is generally assumed that the grid line projection system utilizes a source of light/illumination that approximates a point-type light source. Therefore, as the grid rotates about a central point, a line joining the point light source and the point on each grid line that is closest to the center of rotation traces out an elliptic (quadric) cone. However, it is noted that if the central point of rotation is the closest point on the grid plane, a right circular cone is typically generated. Furthermore, as the point light source moves away from the grid, i.e., toward infinity, which generally causes the projection rays to become parallel, a circular or elliptic cylinder is generated, depending on the location of the center of rotation relative to the light source.

Figure 7:
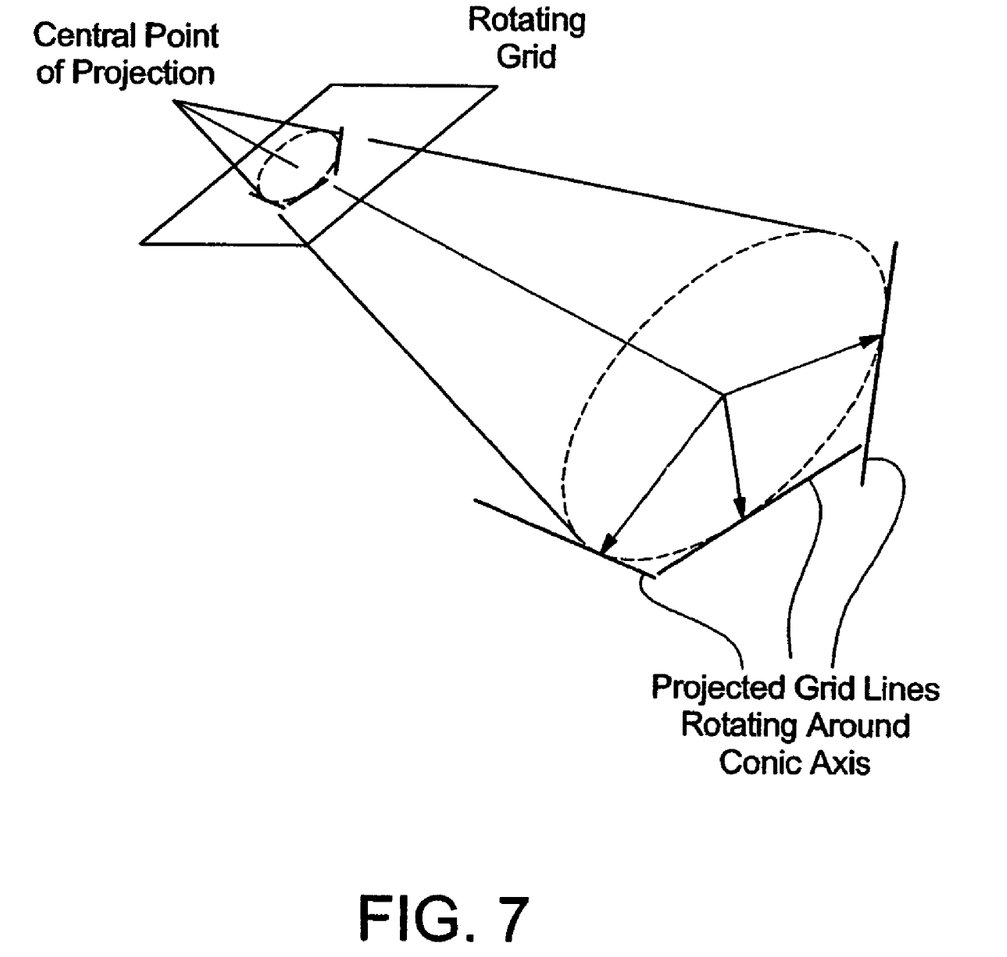
FIG. 7 illustrates the geometry of a projected rotating grid line.
Figure 8:
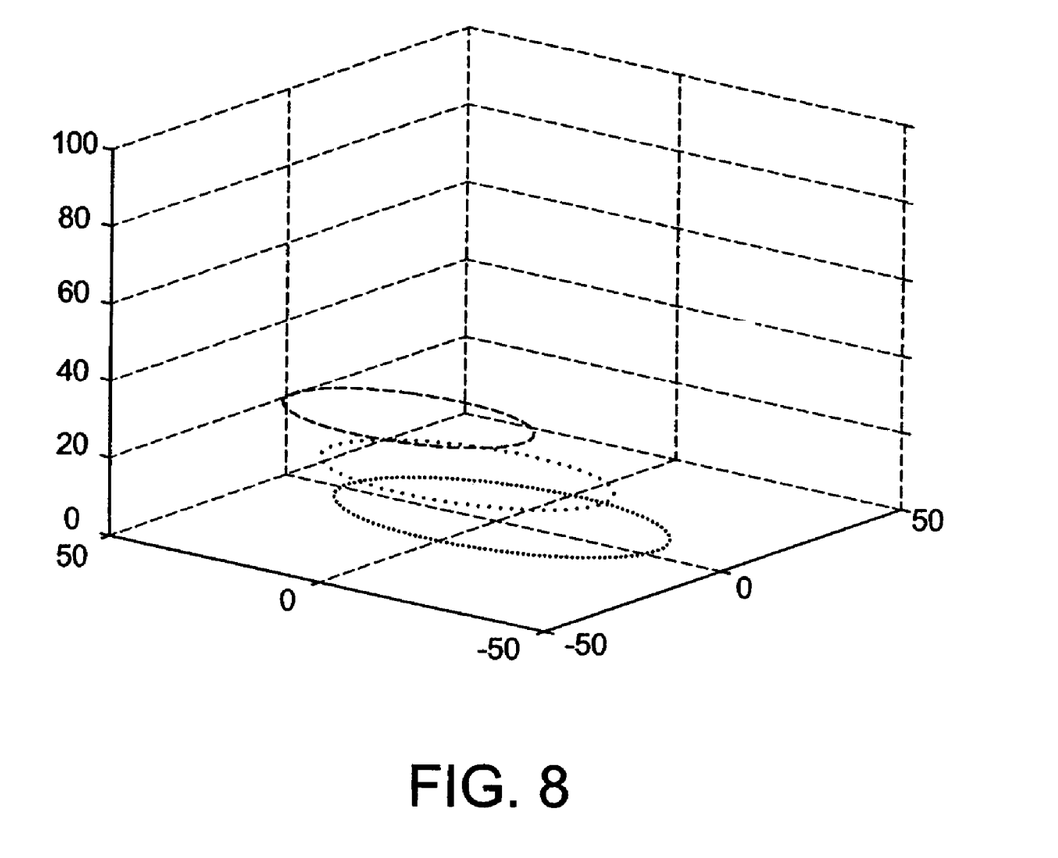
FIG. 8 illustrates three projected grid line points/families.

FIG. 7 illustrates exemplary geometry of a projected rotating grid line, wherein the grid line pattern is rotated and projected from a point light source, the point on each grid line that is closest to the axis of rotation produces a locus of points on an elliptic cone whose axis contains the light source and the center of rotation. Therefore, a quadric surface is swept out by the locus of points. In order to determine the equation for this quadric surface, the following steps will generally be conducted. First, "P" is designated as the point on a specific grid line that is closest to the axis of rotation and $(X_i\ Y_i\ Z_i)_{camera}$ represents the 3D camera coordinate of P as it is projected onto a plane whose equation in the camera system is $Z=Z_i$. Furthermore, $(x_i'\ y_i'\ f)$ represents the location of this projected point in the image plane. Using these base representations, $(X_i\ Y_i\ Z_i)_{absolute}$ may be determined as discussed above with regard to the computation of the absolute coordinates of a plane known in "Z", as illustrated in FIG. 6. As the grid is rotated for a plane of fixed Z, a locus of coplanar points is determined. If the Z plane is displaced and the process of determining the absolute coordinates is repeated, then a family of backprojected non-coplanar points may be recorded for each grid line, as shown in FIG. 8.

Thereafter, for each family of non-coplanar points that was produced by rotating and projecting a single grid line, the method may compute an equation for a representative quadric surface. For example, if it is assumed that $V_i$ is a 9 element column vector represented by $V_i=[X_i^2\ Y_i^2\ Z_i^2\ X_iY_i\ X_iZ_i\ Y_iZ_i\ X_i\ Y_i\ Z_i]^T$, then it may also be assumed that there are "n" projected points. Furthermore, if it is assumed that "M" is an (9×n) matrix where column "i" of M is $V_i$, then it may also be assumed that "C" is a 9 element row vector of unknown coefficients ($C=[C_1\ C_2\ \ldots\ C_9]$) for which a solution is sought. Therefore, "U" may represent an "n" element row vector of ones ($U=[1\ 1\ \ldots\ 1]$). With these parameters established, the equation for the surface that best fits (in the least square sense) the calculated absolute coordinate points may be solved by letting $C\ M=U$ and computing C as $C=U\ M^T\ (M\ M^T)^{-1}$. A corresponding set of C coefficients may then be determined and associated with each grid line to be projected.

Figure 9:
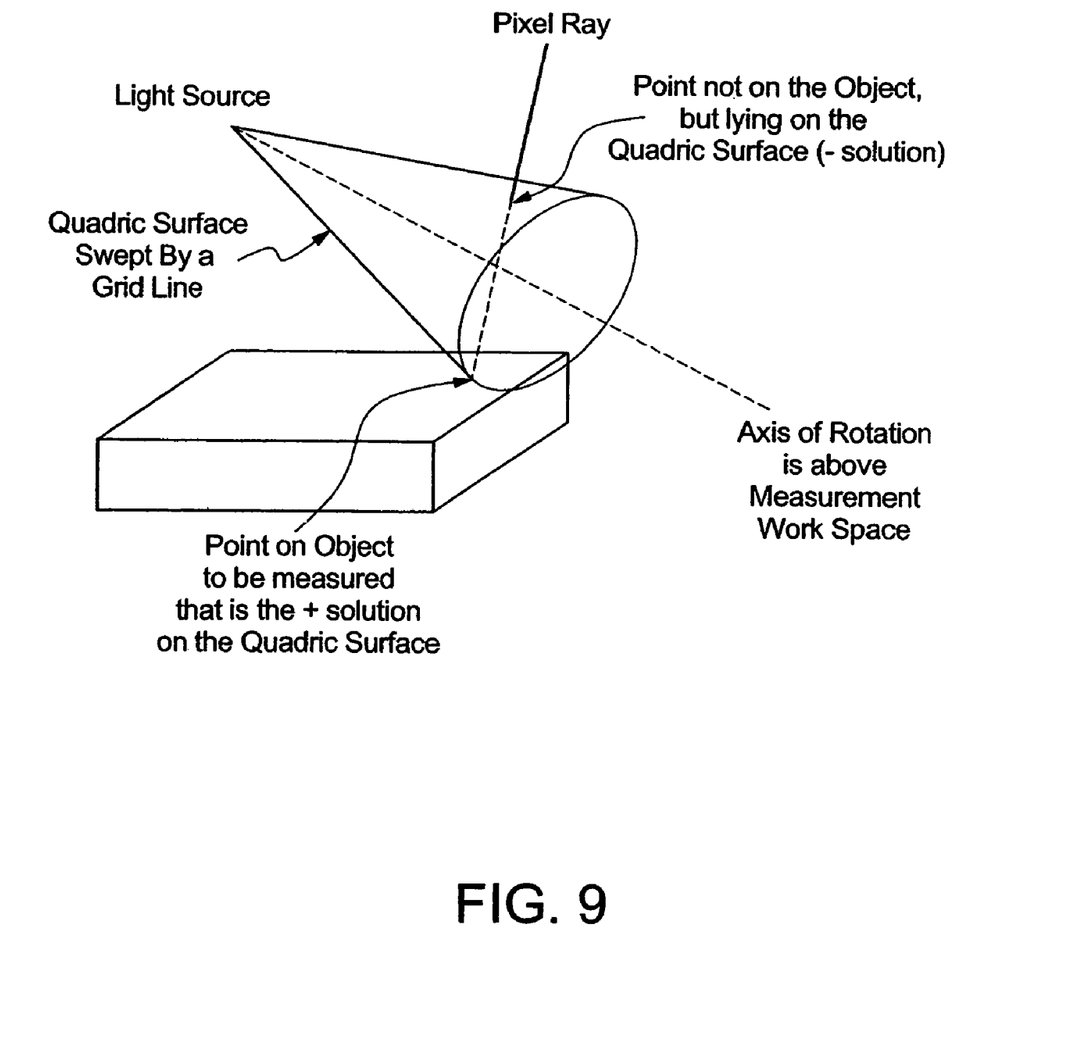
FIG. 9 illustrates the pixel ray intersecting the quadric surface that is used to measure the surface profile of the object to be measured.

With the calibration process complete, embodiments of the invention further include a method for making measurements of a surface profile of an object. Generally, measurement of the surface profile of an object is accomplished by the following method. As the grating rotates, images are recorded and analyzed as described above to determine ρ, the fractional gridline number, at each pixel where a measurement is desired. The 3D location of the point on the surface is determined to be at the intersection of a line projected through the image plane of the camera and the quadric surface defined by ρ, as illustrated in FIG. 9.

In the absolute coordinate system, the location of the intersection of an arbitrary line with a quadric surface may be determined in the following manner. First, it is assumed that the projected line segment passes through the points ($X_1\ Y_1\ Z_1$) and ($X_2\ Y_2\ Z_2$). Then any arbitrary point (X Y Z) on the infinite line joining those two points must satisfy the equation $(X\ Y\ Z)=(X_1\ Y_1\ Z_1)+u((X_2\ Y_2\ Z_2)-(X_1\ Y_1\ Z_1))$. Alternatively, the equation $(X\ Y\ Z)=(X_1\ Y_1\ Z_1)+u(\Delta X\ \Delta Y\ \Delta Z)$, where $\Delta X=X_2-X_1$, $\Delta Y=Y_2-Y_1$, and $\Delta Z=Z_2-Z_1$ must be satisfied. Then, the equation of the quadric surface to be intersected by the line segment may generally be represented by the following quadratic equation:

$$C_1X^2+C_2Y^2+C_3Z^2+C_4XY+C_5XZ+C_6YZ+C_7X+C_8Y+C_9Z-1=0.$$

With this established, the intersection of the line segment with the surface may be determined by substituting the individual (X Y Z) components determined for the arbitrary points into the quadratic equation. This substitution generates the following equation in expanded form:

$$C_1(X_1^2+(2X_1\Delta X)u+(\Delta X)^2 u^2)+C_2(Y_1^2+(2Y_1\Delta Y)u+(\Delta Y)^2 u^2)+C_3(Z_1^2+(2Z_1\Delta Z)u+(\Delta Z)^2 u^2)+C_4(X_1Y_1+(X_1\Delta Y+Y_1\Delta X)u+(\Delta X\Delta Y)u^2)+C_5(X_1Z_1+(X_1\Delta Z+Z_1\Delta X)u+(\Delta X\Delta Z)u^2)+C_6(Y_1Z_1+(Y_1\Delta Z+Z_1\Delta Y)u+(\Delta Y\Delta Z)u^2)+C_7(X_1+(\Delta X)u)+C_8(Y_1+(\Delta Y)u)+C_9(Z_1+(\Delta Z)u)-1=0$$

Collecting terms having the same exponent of u produces the equation:

$$\alpha u^2+\beta u^{2+}\gamma=0$$

The following variable representations may be used to generate the collected form of the equation:

$$\alpha=(C_1(\Delta X)^2+C_2(\Delta Y)^2+C_3(\Delta Z)^2+C_4(\Delta X\,\Delta Y)+C5(\Delta X\,\Delta Z)+C_6(\Delta Y\,\Delta Z)),$$

$$\beta=(C_1(2X_1\,\Delta X)+C_2(2Y_1\Delta Y)+C_3(2Z_1\Delta Z)+C_4(X_1\Delta Y+Y_1\Delta X)+C_5(X_1\Delta Z+Z_1\Delta X)+C_6(Y_1\Delta Z+Z_1\Delta Y)+C_7(\Delta X)+C_8(\Delta Y)+C_9(\Delta Z)),\text{ and}$$

$$\gamma=(C_1X_1^2+C_2Y_1^2+C_3Z_1^2+C_4X_1Y_1+C_5X_1Z_1+C_6Y_1Z_1+C_7X_1+C_8Y_1+C_9Z_1-1).$$

Using the quadratic formula, $\alpha u^2+\beta u^{2+}\gamma=0$ may then be solved for u via the equation $u=(-\beta\pm(\beta^2-4\alpha\gamma)^{0.5}/(2\alpha)$, where the sign of the discriminate is selected to correspond with the location of the object space relative to the projected axis of the grid rotation, as shown in FIG. 9. If the projected axis of rotation is above the work volume, then the sign is positive, otherwise the sign is negative. The value of (X Y Z) may then be determined by applying the equation of the quadric surface to be intersected by the line segment discussed above.

Once the measurement calculations have been made, embodiments of the invention include determining the 3D absolute coordinates from camera rays. In this process, the equations previously described may be employed to determine the coordinates of a point in the absolute coordinate system. More particularly, for any point in the camera's image plane, the method may determine the grid line number (which may be fractional) that crosses it closest to the center of rotation. Thereafter, by rounding up and rounding down, the method may determine the discrete (integer) grid line numbers between which the projected point lies. For clarity in discussing the present exemplary embodiment, let $S_1$ be the surface corresponding to the line number that was rounded down, and let $S_2$ be the surface corresponding to the line number that was rounded up. Let "t" be the fraction (between 0 and 1) above the rounded down integer. Using these representations, intersect the surface equations of $S_1$ and $S_2$ with the line in the absolute coordinate system that joins the camera's optical center with the projected point in the image plane. As discussed above with respect to computation of the absolute coordinates of a point in a plane of known Z, in the absolute coordinate system the camera's optical center will be at $(0\ 0\ -Z_0)$, as the axes of the two systems are parallel and are offset by a distance of $Z_0$ in the Z direction. Similarly, a point in the camera system's image plane at (x' y' f) corresponds to the point $(x'\ y'\ (f-Z_0))$ in the absolute coordinate system. Therefore, the method may let $(X_1\ Y_1\ Z_1)=(0\ 0\ -Z_0)$, and $(X_2\ Y_2\ Z_2)=(x'\ y'\ (f-Z_0))$.

Substituting the results from these equations into the equations used to generate the quadratic equation discussed in the method of the measurement process above, the method of the present exemplary embodiment may solve for the intersection with each quadric surface ($S_1$ and $S_2$). $P_1$ and $P_2$ will then be represented by the points produced by intersecting the camera ray with $S_1$ and $S_2$, respectively. Thereafter, the method may compute the 3D absolute coordinate system of the point between the two surfaces as the weighted sum represented by the equation $P=((1-t)P_1)+(t\,P_2)$.

With regard to design methodology, the process of designing the physical parameters of an embodiment of the invention for application to a specific operational situation, a procedure is used that includes a design spreadsheet via which various system values can be determined. Examples of different operational situations in which the spreadsheet might be used include the size of the object to be measured, the resolution (both in-plane and out-of-plane) to which the object must measured, the speed with which the measurement must occur, and the physical space in which the measurement system must be housed. The design spreadsheet may allow trade-off choices between different operating parameters to be determined prior to system development. Further, the design spreadsheet approach may be based on theoretical and calculated relationships that have been verified via experimental testing. These parameters may include design parameters such as grid line spacing, grid rotation frequency, camera specifications, camera and grid projection angles, lens optical parameters, and other parameters that may effect the operation of the measurement apparatus of the invention. From this information, the design spreadsheet may calculate performance values, such as the measurement resolution, error, and RMS error across the field of view.

Figure 10:
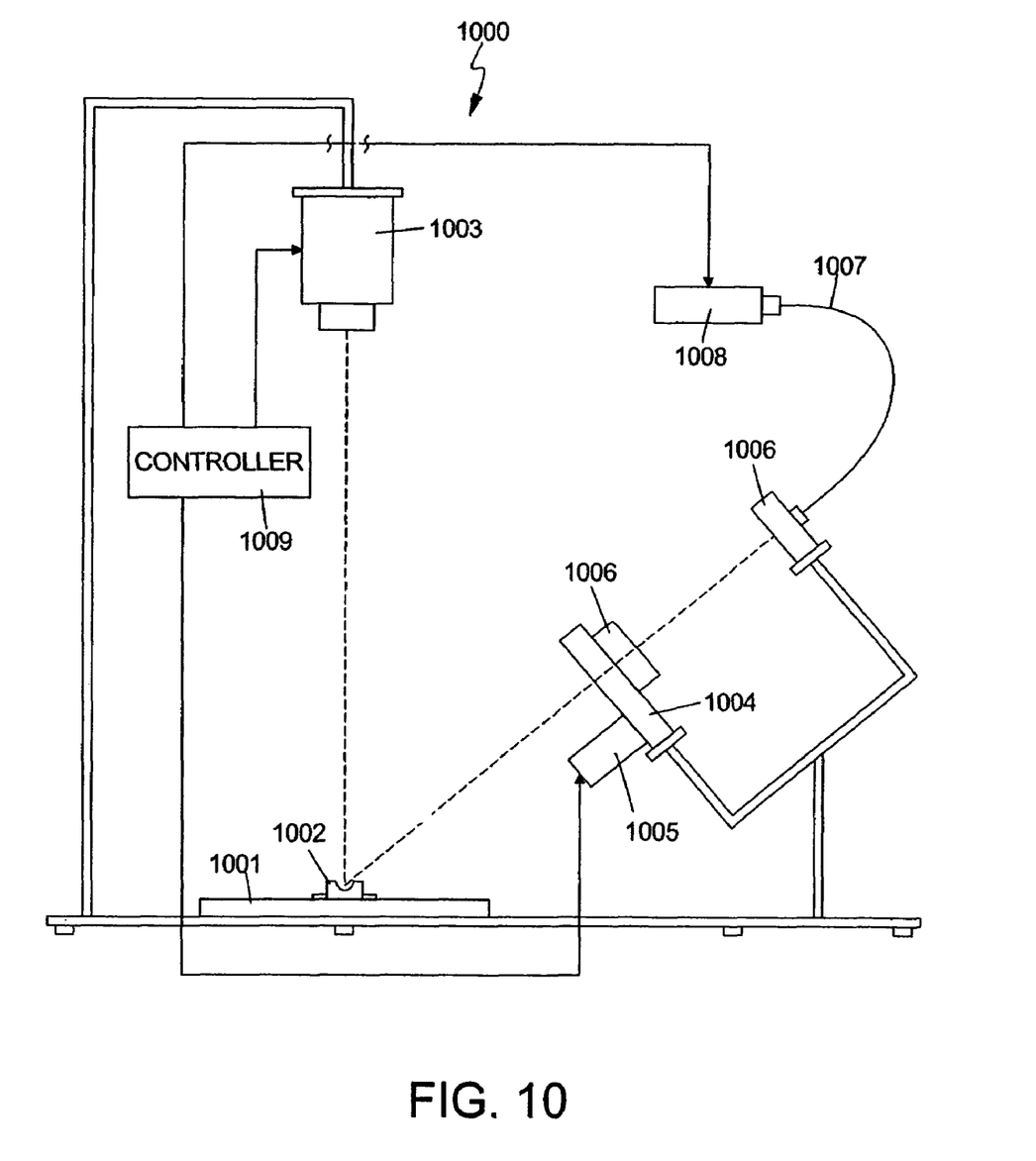
FIG. 10 illustrates an exemplary hardware configuration of the invention.

FIG. 10 illustrates an exemplary hardware configuration of an embodiment of the invention. The exemplary surface profile measuring apparatus 1000 generally includes a projection portion, a measuring surface portion, and a recording/imaging portion. The projection portion generally includes a light source 1008, which may be a mercury vapor lamp, for example, which may be in optical communication with a condensing/projection lens 1006 via a fiber optic communications medium 1007, such as an Oriel #77524, for example. Light source 1008 may be any point-type optical source calculated to generate an intense light from a relatively compact package, such as an Oriel mercury vapor light model number #6282 mounted in an Oriel series Q housing. The optical signal received by the condensing/projection lens 1006 may be transmitted to another condensing lens 1006 mounted proximate a rotatable precision grating 1004. Precision grating 1004 may be, for example, a precision grating publicly available from Edmund Scientific (part # K40-655) or Oriel, for example. Lenses 1006 may be similar to the type of lenses utilized in projectors for video and slide projection, which are publicly available from companies such as Kodak, Edmund Scientific, and other known sources. Grid 1004 may be rotatably mounted via precise tolerance bearings and in mechanical communication with a motor 1005, which may operate to impart precise rotational motion thereto. Motor 1005 may be a stepping motor, for example. The grid 1004, motor 1005, and condensing lenses 1006 may be mounted on a rigid frame in order to maintain optical alignment between the respective devices.

The measuring surface portion generally includes a measuring surface 1001 positioned in the optical path of the light being emitted from the grating 1006. An object to be measured 1002 may be placed on the measuring surface 1001 in the optical path so that the optical image projected from grating 1004 may be viewed on the object to be measured 1002.

The imaging portion of the invention includes a high-speed video imager 1003, such as the Pulnix 6710, or other progressive scan-type camera or device. The camera 1003 is aligned with a global coordinate system to be used. Although the camera 1003 is shown aligned with the global coordinate system, it could be placed in other orientations and the measurements could be converted to global coordinates by mathematical transformations. The camera lens is generally a low optical distortion type lens, such as made for high quality video or film imaging, and generally may be obtained from Nikon or Rodenstock. Video images may be digitized and recorded using a frame grabber (not shown), such as the National Instruments PCI-1424. Analysis of the sequence of images and mathematical computations may be accomplished with a digital computer/system controller 1009, such as a Hewlett Packard Kayak or Dell Dimension, for example. Controller 1009 may be in communication with camera 1003 to receive and control the operation thereof. Additionally, controller 1009 may be in communication with light source 1008 and motor 1005 to regulate the operation of these components as well.

In operation, light source 1008 of measuring apparatus 1000 generates an optical signal. The optical signal is transmitted to a first condensing/projection lens 1006 by a fiber optic cable 1007. The light is transmitted therethrough by lens 1006 to another lens 1006 positioned proximate a rotatably mounted precision grating 1004. Grating 1004, which will generally be in rotation as a result of stepping motor 1005, receives the light emitted from lens 1006 and projects a moving grating image on the measuring surface 1001 and the object to be measured 1002, which is generally positioned thereon. The projected grating may be viewed by a high frame rate camera/imaging device 1003, which may operate to digitize the images for processing.

A system controller 1009 may operate to receive the output of the camera 1003 and/or digitizing device and process the input. Controller 1009 may further operate to regulate the operation of the light source 1008 and the rotation rate of grating 1004 through selective control over stepping motor 1005. The images recorded by camera 1003 may be processed and analyzed by controller 1009 to determine the fractional gridline number for each image at each pixel of the image for which measurement is desired. The 3 dimensional location of each point to be measured on the surface of the object may be determined through mathematically locating the intersection of a line projected through the image plane of the camera 1003 and a quadric surface defined by the fractional grid line, wherein the point on the quadratic surface corresponds to the point on the object surface. Controller 1009 may utilize this operation to determine the surface profile of the object to be measured through analysis of several, often thousands, of images captured by camera 1003.

While the foregoing is directed to embodiments of the present invention, other and further embodiments of the invention may be devised without departing from the basic scope thereof, and the scope thereof is determined by the claims that follow.

What is claimed is:

1. A method for calibrating a dynamic structured light measuring system including an imaging device, comprising:
   determining a focal length of said imaging device;
   determining a transformation from an imaging device coordinate system of said image device to an absolute coordinate system of said dynamic structured light measuring system;
   determining absolute coordinates of a point in a plane based on said transformation, wherein a Z coordinate of the plane is known; and
   determining at least one quadric surface containing projected grid line tracks generated by rotating a grid about a central point at a location between a point of light and a reference measurement surface of said image device such that a line joining said point light source and a point on each grid line that is closest to said central point traces out said at least one quadric surface.

2. The method of claim 1, wherein determining the focal length comprises:
   acquiring a first image of a calibration object;
   calculating a first calibration parameter for the calibration object from the first image;
   adjusting the position of the object a first known distance;
   acquiring a second image of the calibration object;
   calculating a second calibration parameter for the calibration object from the second image; and
   determining the focal length from the first and second calibration parameters.

3. The method of claim 2, wherein the calibration object comprises at least three circular markings having collinear centers such that a line joining the collinear centers is parallel with an X axis of the imaging device.

4. The method of claim 3, wherein the first and second calibration parameters comprise a distance between outer centers of the at least three circular markings.

5. The method of claim 2, further comprising:
   adjusting the position of the object a second known distance;
   acquiring a third image of the calibration object;
   calculating a third calibration parameter for the calibration object from the third image; and
   determining the focal length from the first, second, and third calibration parameters.

6. The method of claim 1, wherein determining a transformation from an imaging device coordinate system to an absolute coordinate system comprises:
   positioning a calibration object such that a plane containing the calibration object is coplanar with an absolute coordinate system and contains an origin of the absolute coordinate system, and such that a line joining circles of the calibration object is collinear with an X axis of the absolute coordinate system; and
   determining a distance between an optical center of the imaging device and the plane containing the calibration object using the focal length.

7. The method of claim 1, wherein each individual quadric surface of the at least one quadric surface is derived through curve fitting to the projected gridline tracks in three or more reference planes.

8. The method of claim 1, wherein each individual quadric surface of the at least one quadric surface is derived through a least squares fit method.

9. The method of claim 8, wherein the least squares fit method further comprises solving the equation $C = U M^T (M M^T)^{-1}$, wherein C represents a nine element row vector of unknown coefficients, M represents a matrix having nine rows and a number of columns that corresponds to a number of projected points, and U represents a row vector of ones having a number of vector elements that coffesponds to the number of projected points.

10. The method of claim 9, further comprising determining a set of coefficients associated with each projected grid line.

11. The method of claim 1, wherein determining at least one quadric surface containing projected grid line tracks further comprises independently determining each individual quadric surface.

12. A method for calibrating a dynamic structured light measuring system, comprising:
   determining a focal length of an optical imaging device of said dynamic structured light measuring system positioned above a reference measurement surface of said dynamic structured light measuring system;
   calculating a transformation from a camera coordinate system to an absolute coordinate system;
   determining absolute coordinates of a point in a first plane above the reference measurement surface using the transformation, wherein a distance from the reference measurement surface to the first plane is known; and
   determining at least one quadric surface containing projected grid line tracks generated by rotating a grid about a central point at a location between a light source and said reference measurement surface such that a line joining said light source and a point on each grid line that is closest to the central point traces out said at least one quadric surface.

13. The method of claim 12, wherein determining the focal length comprises:
   orienting the optical imaging device;
   positioning a planar calibration object having at least three markings having collinear centers above the reference measurement surface a first distance in a manner such that a plane of the calibration object is perpendicular to an optical axis of the optical imaging device and so that a line joining the centers is parallel with an X-axis of the optical imaging device;
   calculating a first image plane distance between centroids of outer markings of the at least three markings for the first distance;
   positioning the calibration object a second distance above the reference measurement surface, where the second distance is not equal to the first distance; calculating a second image plane distance between centroids of outer markings of the at least three markings for the second distance; and
   calculating the focal length from the first and second image plane distances.

14. The method of claim 12, wherein calculating a transformation from a camera coordinate system to an absolute coordinate system comprises:
   positioning calibration markings such that a plane containing the calibration markings is coplanar with an absolute system, the plane containing the calibration markings contains an origin of the absolute coordinate system, and such that a line joining the calibration markings is collinear with an X-axis of the absolute coordinate system;
   determining the distance between an optical center of the optical imaging device and a plane of a calibration object from the equation $Z_0 = f(D/d_0)$, where $Z_0$ is the distance between an optical center of the optical imaging device and the plane of a calibration object, f is a focal length of the optical imaging device, D is a distance between centers of calibration markings, and $d_0$ is the distance between projections of the centers of the calibration markings; and
   calculating the transformation from the optical imaging device coordinate system to the absolute coordinate system from the equation $Z_{Camera} = Z_{Absolute} + Z_0$.

15. The method of claim 12, wherein determining at least one surface containing projected grid line tracks comprises:
   providing a point light source;
   rotating a grid about a central point at a location between the point light source and the reference measurement surface such that a line joining the point light source and a point on each grid line that is closest to the central point traces out a quadric cone; and independently determining the quadric surface.

16. The method of claim 12, wherein each of the at least one quadric surfaces is through curve fitting to the projected gridline tracks in three or more reference planes.

17. The method of claim 12, wherein each of the at least one quadric surfaces is derived through a least squares fit method.

18. The method of claim 17 wherein the least squares fit method further comprises solving the equation $C = U M^T (M M^T)^{-1}$, wherein, C represents a nine element row vector of unknown coefficients, M represents a matrix having nine rows and a number of columns that corresponds to a number of projected points, and U represents a row vector of ones having a number of vector elements that coffesponds to the number of projected points.

19. The method of claim 18, further comprising determining a set of coefficients associated with each projected grid line.

* * * * *